US009066002B2

(12) United States Patent
Miyagi et al.

(10) Patent No.: US 9,066,002 B2
(45) Date of Patent: *Jun. 23, 2015

(54) SYSTEM AND METHOD FOR UTILIZING ENHANCED SCENE DETECTION IN A DEPTH ESTIMATION PROCEDURE

(75) Inventors: Kensuke Miyagi, Sunnyvale, CA (US); Pingshan Li, Sunnyvale, CA (US)

(73) Assignee: Sony Corporation, Tokyo (JP)

( * ) Notice: Subject to any disclaimer, the term of this patent is extended or adjusted under 35 U.S.C. 154(b) by 454 days.

This patent is subject to a terminal disclaimer.

(21) Appl. No.: 13/597,494

(22) Filed: Aug. 29, 2012

(65) Prior Publication Data

US 2014/0064552 A1 Mar. 6, 2014

(51) Int. Cl.
*G06K 9/00* (2006.01)
*H04N 5/232* (2006.01)

(52) U.S. Cl.
CPC ........ *H04N 5/23212* (2013.01); *G06K 9/00624* (2013.01)

(58) Field of Classification Search
None
See application file for complete search history.

(56) References Cited

U.S. PATENT DOCUMENTS

| 7,711,201 | B2 | 5/2010 | Wong et al. | |
|---|---|---|---|---|
| 8,340,456 | B1 * | 12/2012 | DaneshPanah et al. | 382/255 |
| 8,736,707 | B2 * | 5/2014 | Li et al. | 348/222.1 |
| 2004/0247345 | A1 * | 12/2004 | Stelter et al. | 399/267 |
| 2006/0061569 | A1 * | 3/2006 | Yamada | 345/422 |
| 2007/0019883 | A1 | 1/2007 | Wong et al. | |
| 2010/0080482 | A1 | 4/2010 | Wong et al. | |
| 2011/0142287 | A1 | 6/2011 | Wong et al. | |
| 2012/0026349 | A1 * | 2/2012 | Ishii et al. | 348/208.4 |
| 2012/0033094 | A1 * | 2/2012 | Ishii et al. | 348/208.6 |
| 2012/0200673 | A1 | 8/2012 | Tagawa et al. | |

FOREIGN PATENT DOCUMENTS

EP    2 600 310 A2    6/2013

OTHER PUBLICATIONS

Igor Aizenberg, Dmitriy V. Paliy, Jacek M. Zurada, Jaakko T. Astola, Blur Identification by Multilayer Neural Network Based on Multivalued Neurons, http://cl.uofl.edu/zurada/publications/aizenberg.tnn.2008.pdf, May 2008, Texas A&M University, Texarkana, TX,US, Tampere University of Tech. Tampere, FL, US, Uni. of Louisville, Louisville, KY, US, 1-16 pgs.

* cited by examiner

*Primary Examiner* — Stephen R Koziol
*Assistant Examiner* — Amandeep Saini
(74) *Attorney, Agent, or Firm* — Gregory J. Koerner; Redwood Patent Law

(57) ABSTRACT

A system for performing an enhanced scene detection procedure including a sensor device for capturing blur images of a photographic target. The blur images each correspond to a scene type that is detected from a first scene type which is typically a pillbox blur scene, and a second scene type which is typically a Gaussian scene type. A scene detector performs an initial scene detection procedure to identify a candidate scene type for the blur images. The scene detector then performs the enhanced scene detection procedure to identify a final scene type for the blur images.

20 Claims, 18 Drawing Sheets

SYSTEM AND METHOD FOR UTILIZING ENHANCED SCENE DETECTION IN A DEPTH ESTIMATION PROCEDURE

BACKGROUND SECTION

1. Field of the Invention

This invention relates generally to techniques for analyzing image data, and relates more particularly to a system and method for utilizing enhanced scene detection in a depth estimation procedure.

2. Description of the Background Art

Implementing efficient methods for analyzing image data is a significant consideration for designers and manufacturers of contemporary electronic devices. However, efficiently analyzing image data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively analyzes digital image data may benefit from an effective implementation because of the large amount and complexity of the digital data involved.

Due to growing demands on system resources and substantially increasing data magnitudes, it is apparent that developing new techniques for analyzing image data is a matter of concern for related electronic technologies. Therefore, for all the foregoing reasons, developing effective systems for analyzing image data remains a significant consideration for designers, manufacturers, and users of contemporary electronic devices.

SUMMARY

In accordance with the present invention, a system and method for utilizing enhanced scene detection in a depth estimation procedure is disclosed. In one embodiment, a camera initially captures an image1. The focus setting of the camera is then changed. The camera then captures a defocused blur image2 that is more blurry (out of focus) than previously captured image1.

A scene detector or other appropriate entity performs an initial scene detection procedure to produce a candidate scene type. For example, scene detector may identify the captured image1 and image2 as part of a candidate pillbox scene. Conversely, the scene detector may identify the captured image1 and image2 as part of a Gaussian scene. In accordance with the present invention, the scene detector then performs an enhanced scene analysis procedure upon the pillbox blur candidates to thereby verify that these detection results are accurate. The enhanced scene analysis procedure may include a radius analysis procedure and/or a registration analysis procedure.

In the radius analysis procedure, the scene detector initially counts the number of saturated pixels in each of the two pillbox blur candidates, and then utilizes the two saturated pixels totals to calculate radius values for the two respective pillbox blur candidates. The scene detector then utilizes the two radius values to calculate a current radius change rate for the pillbox blur candidates. The scene detector compares the current radius change rate to a predefined calibrated radius change rate. In certain embodiments, the predefined calibrated radius change rate may be derived from a calibrated radius change curve that expresses a linear dependence of blur radius sizes and depth-of-focus distance values.

The scene detector then determines whether the current radius change rate matches the predefined calibrated radius change rate. If not, then the scene detector reclassifies the pillbox blur candidates as Gaussian blurs. However, if the current radius change rate matches the predefined calibrated radius change rate, then the scene detector retains the original detection result for the two pillbox blur candidates.

In the registration analysis procedure, the scene detector or other appropriate entity initially accesses the two pillbox blur candidates. The scene detector then performs a registration analysis procedure upon the pillbox blur candidates to verify that these detection results are accurate. The registration analysis procedure may be performed by utilizing any effective techniques. For example, in certain embodiments, the scene detector may evaluate registration characteristics for the pillbox blur candidates by determining whether each saturated pixel from one blur image is also saturated in the other blur image at the same pixel coordinate location.

The scene detector thus determines whether the two blur images are aligned. If the scene detector determines because of good registration characteristics that the pillbox blur candidates are correctly classified, then the scene detector retains the pillbox detection results. However, if the scene detector determines because of bad registration characteristics that that the pillbox blur candidates where incorrectly classified, then the scene detector reclassifies the pillbox blur candidates as Gaussian blur images. A depth estimator may then select and perform an appropriate depth estimation procedure. The present invention therefore provides an improved system and method for utilizing enhanced scene detection for performing a depth estimation procedure.

DETAILED DESCRIPTION

The present invention relates to an improvement in image data analysis techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for performing an enhanced scene detection procedure, and includes a sensor device for capturing blur images of a photographic target. The blur images each correspond to a scene type that is detected from a first scene type which is typically a pillbox blur scene, and a second scene type which is typically a Gaussian scene type. A scene detector performs an initial scene detection procedure to identify a candidate scene type for the blur images. The scene detector then performs the enhanced scene detection procedure to identify a final scene type for the blur images.

Figure 1:
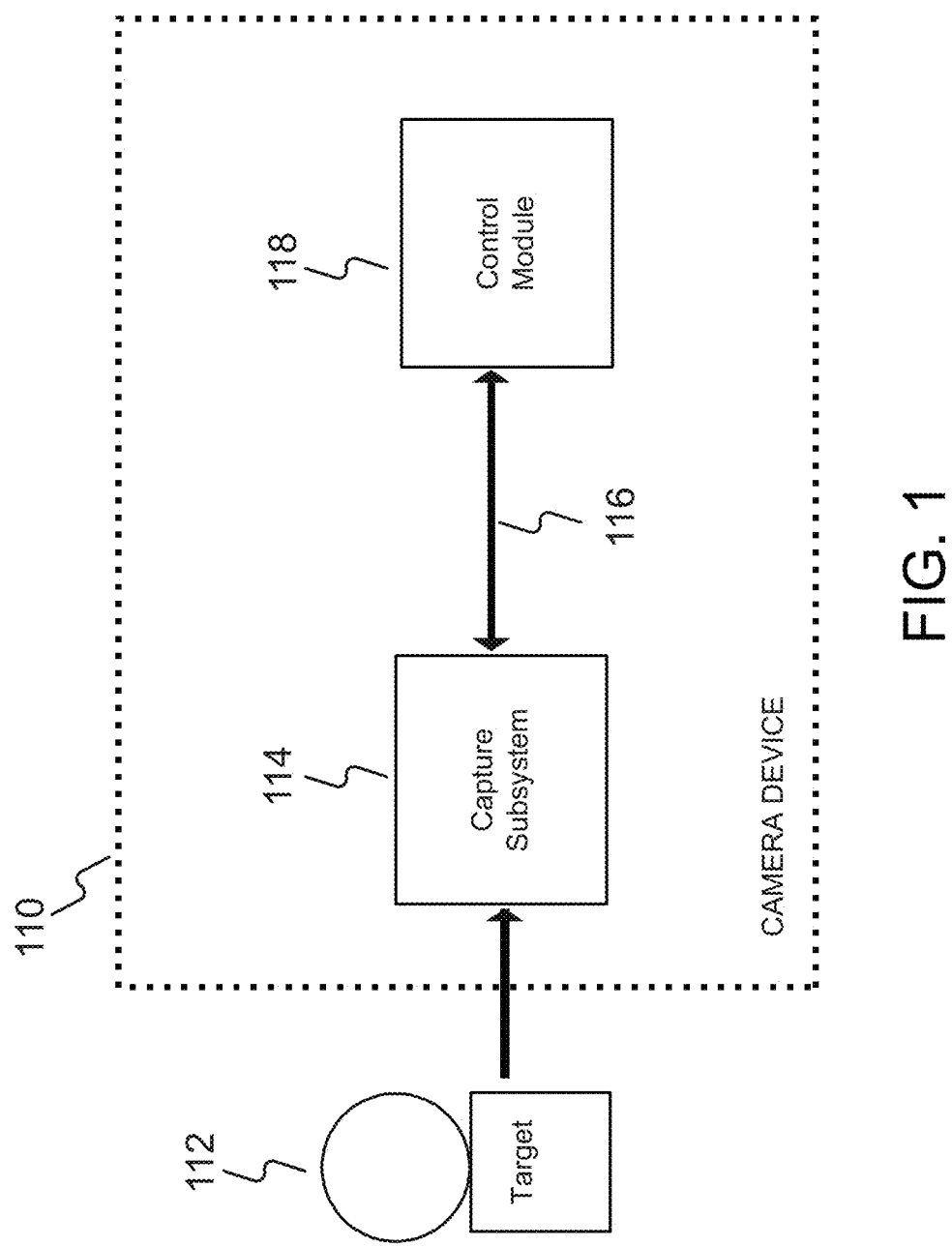
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a photographic target 112, and may also be electrically coupled via system bus 116 to control module 118.

In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1. For example, camera device 110 may alternately be implemented as an imaging device, a computer device, or a consumer electronics device.

In the FIG. 1 embodiment, once capture subsystem 114 of camera 110 is automatically focused on target 112, a camera user may request camera device 110 to capture image data corresponding to target 112. Control module 118 then may preferably instruct capture subsystem 114 via system bus 116 to capture image data representing target 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
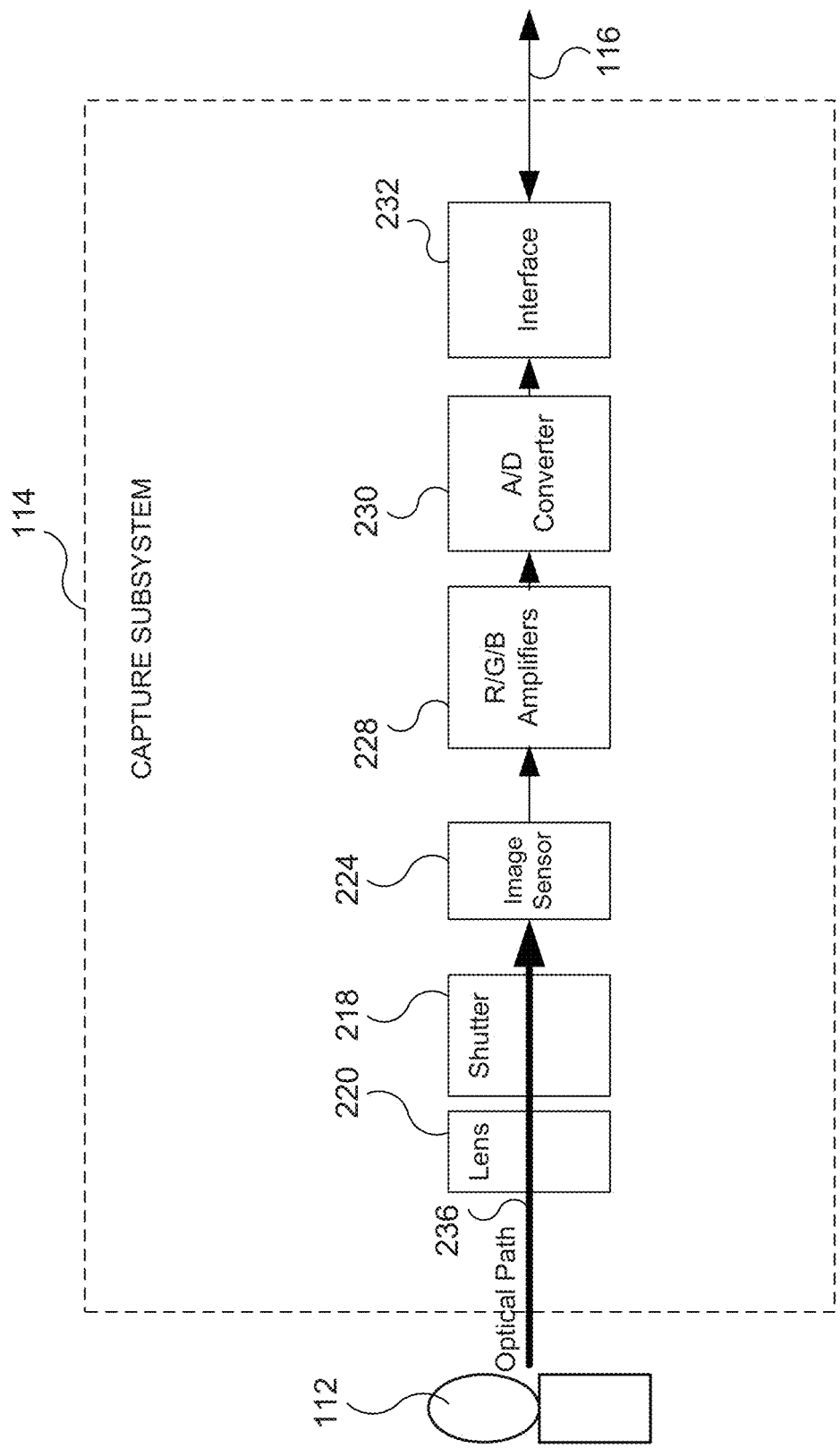
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, capture subsystem 114 preferably comprises, but is not limited to, a shutter 218, a lens 220, an image sensor 224, red, green, and blue (R/G/B) amplifiers 228, an analog-to-digital (A/D) converter 230, and an interface 232. In alternate embodiments, capture subsystem 114 may readily include various other components in addition to, or instead of, those components discussed in conjunction with the FIG. 2 embodiment.

In the FIG. 2 embodiment, capture subsystem 114 may capture image data corresponding to target 112 via reflected light impacting image sensor 224 along optical path 236. Image sensor 224, which may preferably include a charged-coupled device (CCD), may responsively generate a set of image data representing the target 112. The image data may then be routed through amplifiers 228, A/D converter 230, and interface 232. From interface 232, the image data passes over system bus 116 to control module 118 for appropriate processing and storage. Other types of image capture sensors, such as CMOS or linear arrays are also contemplated for capturing image data in conjunction with the present invention. The utilization and functionality of camera 110 is further discussed below in conjunction with FIGS. 3-14.

Figure 3:
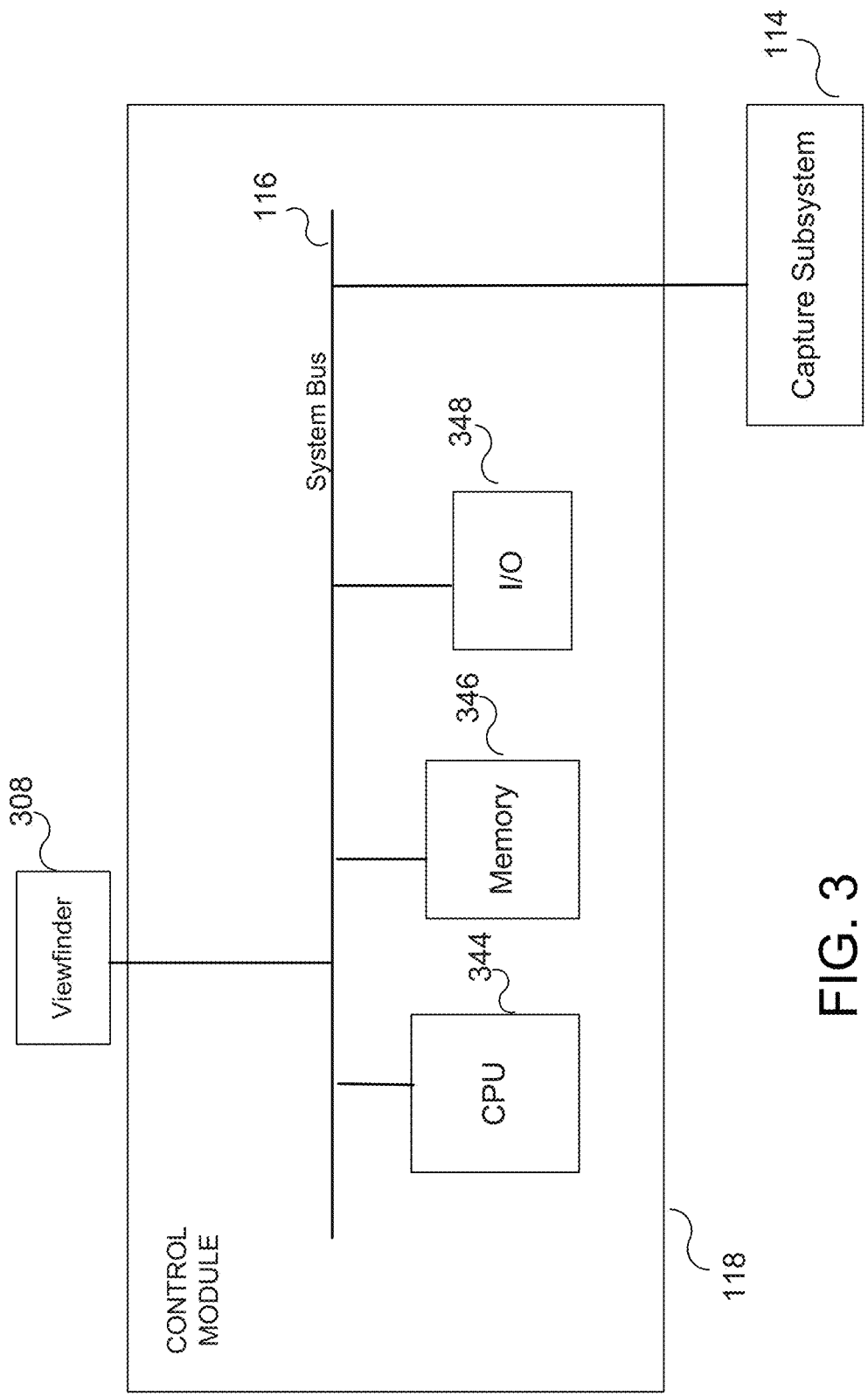
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and one or more input/output interface(s) (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may be implemented to include any appropriate microprocessor device. Alternately, CPU 344 may be implemented using any other appropriate technology. For example, CPU 344 may be implemented to include certain application-specific integrated circuits (ASICs) or other appropriate electronic devices. Memory 346 may be implemented as one or more appropriate storage devices, including, but not limited to, read-only memory, random-access memory, and various types of non-volatile memory, such as floppy disc devices, hard disc devices, or flash memory. I/O 348 may provide one or more effective interfaces for facilitating bi-directional communications between camera device 110 and any external entity, including a system user or another electronic device. I/O 348 may be implemented using any appropriate input and/or output devices. The operation and utilization of control module 118 are further discussed below in conjunction with FIGS. 4 through 14.

Figure 4:
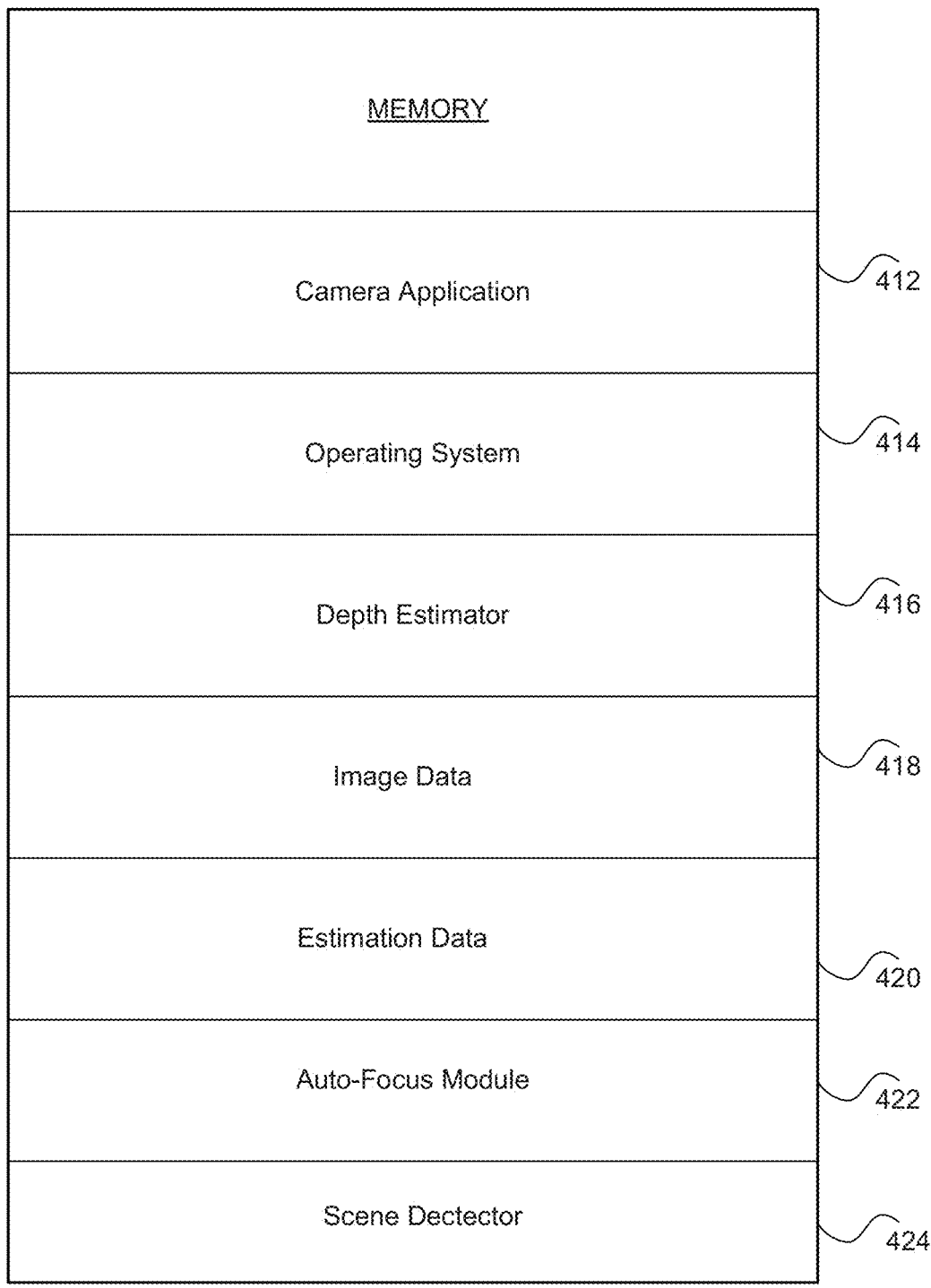
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may include, but is not limited to, a camera application 412, an operating system 414, a depth estimator 416, image data 418, estimation data 420, an auto-focus module 422, and a scene detector 424. In alternate embodiments, memory 346 may include various other components in addition to, or instead of, those components discussed in conjunction with the FIG. 4 embodiment.

In the FIG. 4 embodiment, camera application 412 may include program instructions that are preferably executed by CPU 344 (FIG. 3) to perform various functions and operations for camera device 110. The particular nature and functionality of camera application 412 preferably varies depending upon factors such as the type and particular use of the corresponding camera device 110.

In the FIG. 4 embodiment, operating system 414 preferably controls and coordinates low-level functionality of camera device 110. In accordance with the present invention, depth estimator 416 may control and coordinate a depth estimation procedure to facilitate automatic focus features in camera 110. In the FIG. 4 embodiment, image data 418 may include one or more images of a photographic target 112 captured by camera device 110. Estimation data 420 may include any types of information or data for performing a depth estimation procedure. In the FIG. 4 embodiment, autofocus module 422 may utilize the results of the depth estimation procedure to perform an auto-focus procedure for camera device 110. In the FIG. 4 embodiment, scene detector 424 may perform various enhanced scene detection procedures in accordance with the present invention. Additional details regarding the operation of scene detector 424 are further discussed below in conjunction with FIGS. 11-14.

Figure 5:
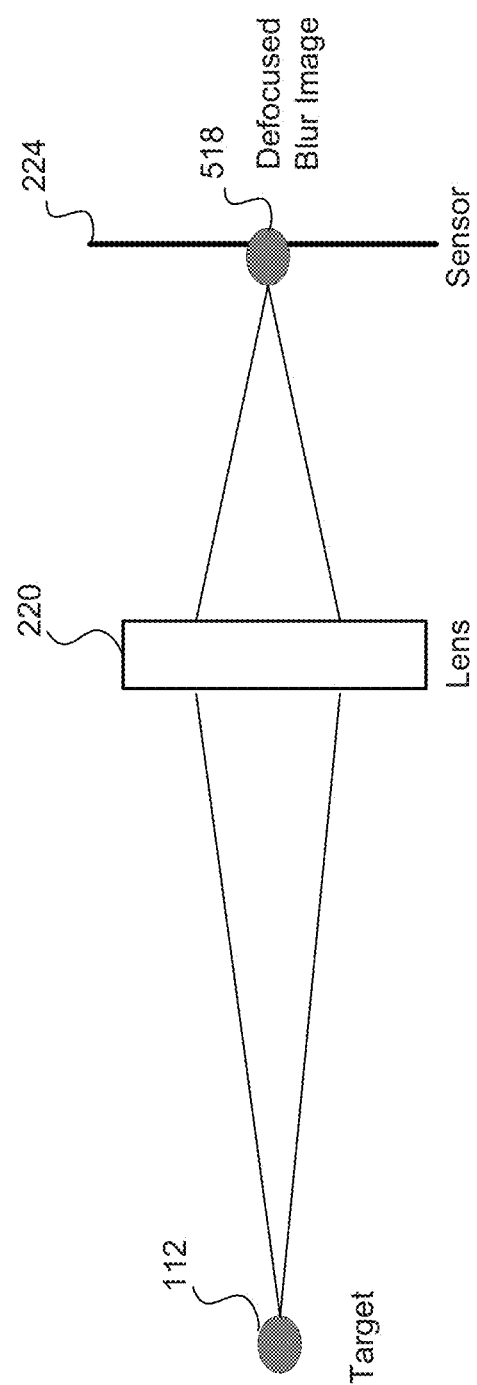
FIG. 5 is a diagram of one exemplary embodiment for capturing a defocused blur image, in accordance with the present invention.

Referring now to FIG. 5, a diagram of one exemplary embodiment for capturing a defocused blur image 518 is shown, in accordance with the present invention. The FIG. 5 embodiment is provided for purposes of illustration, and in alternate embodiments, the present invention may utilize various other configurations and elements to capture defocused blur images 518.

In the FIG. 5 embodiment, a sensor 224 of a camera 110 (see FIG. 2) may capture a defocused blur image 518 of a photographic target or scene 112 for performing a depth estimation procedure. The defocused blur image 518 may be created by adjusting lens 220 to a position other than the correct in-focus lens position that depends upon the relative positions of target 112, lens 220, and sensor 224.

In one embodiment, two different defocused blur images 518 may be compared to derive a depth estimation. A blur difference may be calculated for two blur images 518 that are one depth-of-field away from each other. A slope of a known matching curve and the blur difference can be utilized to determine the depth of a given target 112. The generation and utilization of defocused blur images for depth estimation are further discussed below in conjunction with FIGS. 6-14.

Figure 6:
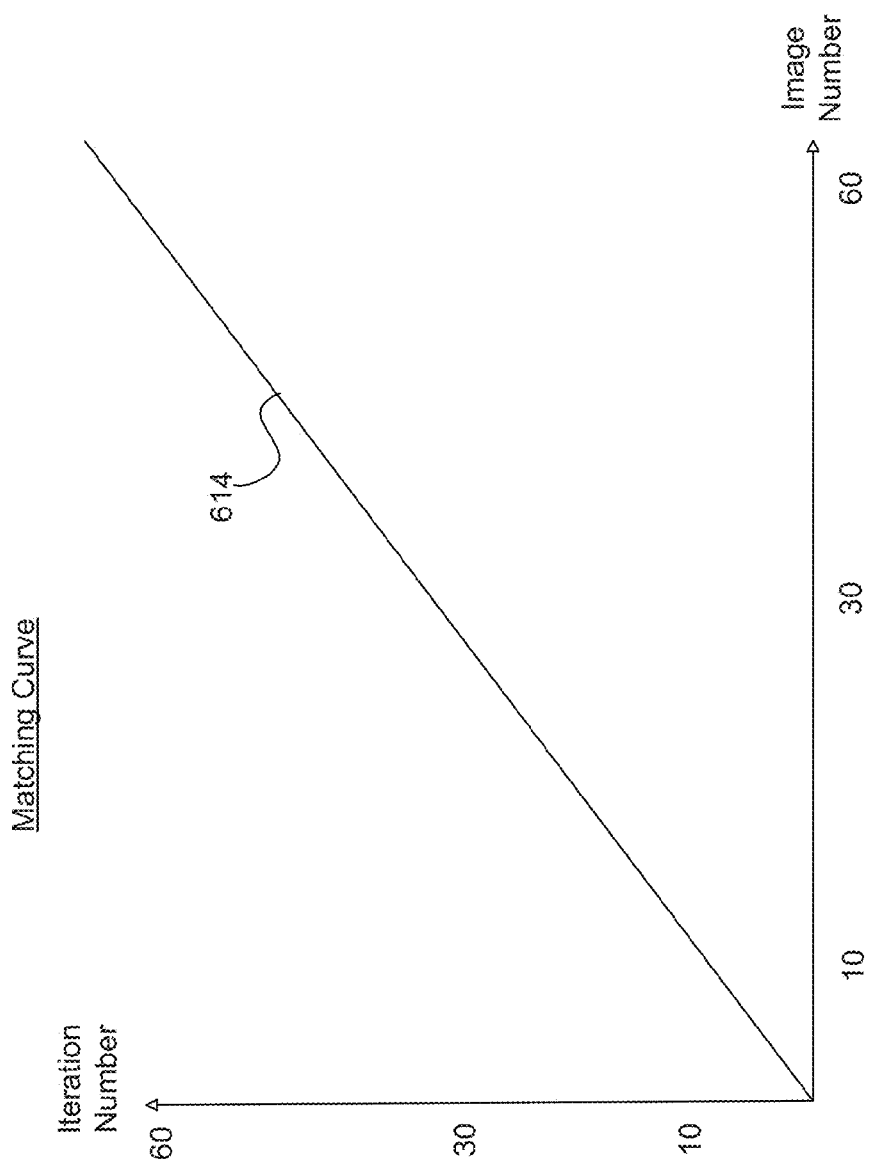
FIG. 6 is a graph of an exemplary matching curve, in accordance with one embodiment of the present invention.

Referring now to FIG. 6, a graph of an exemplary matching curve 714 is shown, in accordance with one embodiment of the present invention. The FIG. 6 embodiment is presented for purposes of illustration, and in alternate embodiments, the present invention may be implemented to utilize matching curves with configurations and parameters in addition to, or instead of, certain of those configurations and parameters discussed in conjunction with the FIG. 6 embodiment.

In certain embodiments, a blur image1 and a more-defocused blur image2 may be captured, the sharper image1 may be convolved with a Gaussian kernel (for example, a 3×3 Gaussian matrix with small variance) to produce a convolved image1. The convolved image1 is compared to blur image2. This process is repeated until the two blur image match. The number of iterations may then be graphed against depth-of-field (or image numbers in increments of one DOF) to produce a blur matching curve that can be used to estimate the distance from any out-of-focus position to the in-focus position. Additional details regarding the foregoing depth estimation technique are further discussed in U.S. Pat. No. 8,045,046 to Li et al., which is hereby incorporated by reference.

Figure 7:
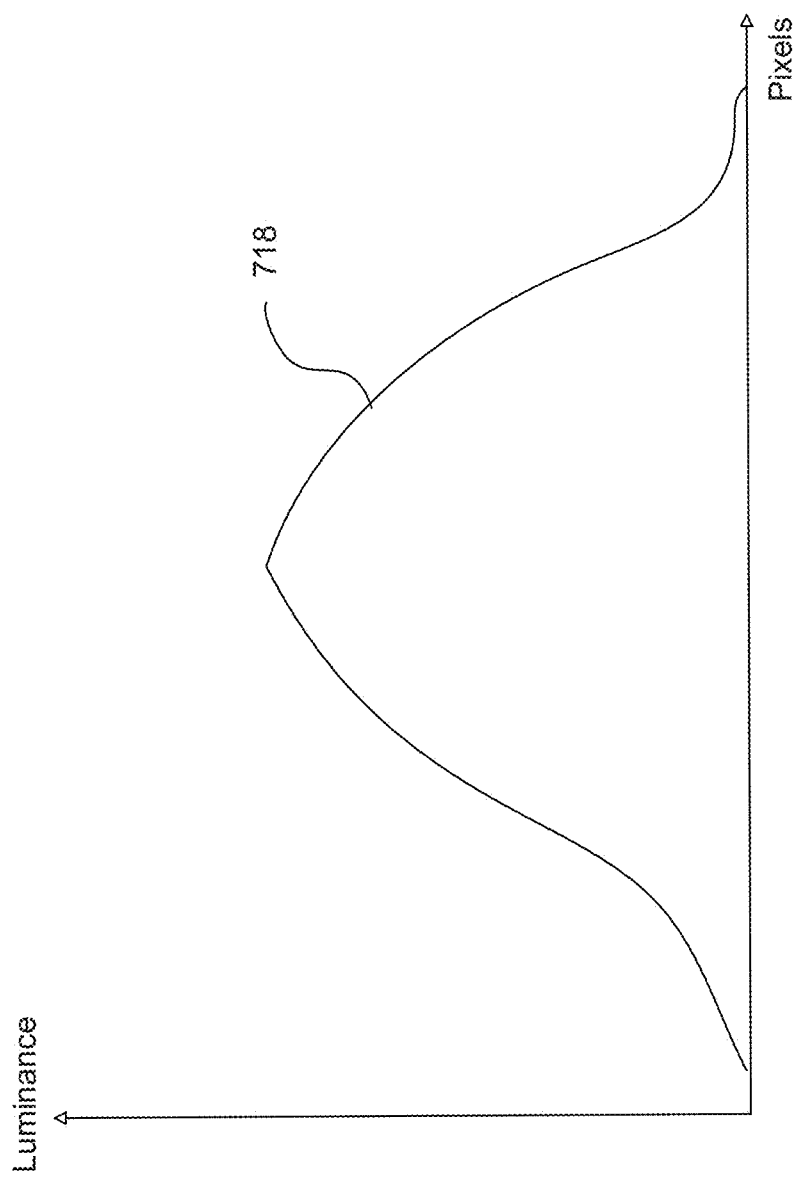
FIG. 7 is a graph of an exemplary Gaussian model of a blur image, in accordance with one embodiment of the present invention.

Referring now to FIG. 7, a graph of an exemplary Gaussian model 718 of a blur image 518 (FIG. 5) is shown, in accordance with one embodiment of the present invention. The FIG. 7 embodiment is presented for purposes of illustration, and in alternate embodiments, the present invention may utilize Gaussian models with elements and configurations other than those discussed in conjunction with the FIG. 7 embodiment.

In the FIG. 7 embodiment, luminance is represented on a vertical axis and pixels are represented on a horizontal axis. In the FIG. 7 graph, Gaussian model 718 displays a typical bell-curve shape. However, not all blur images 518 are best represented by utilizing a Gaussian model 718. Depending upon image characteristics of a photographic target or scene, certain non-Gaussian models may be more effective.

Figure 8:
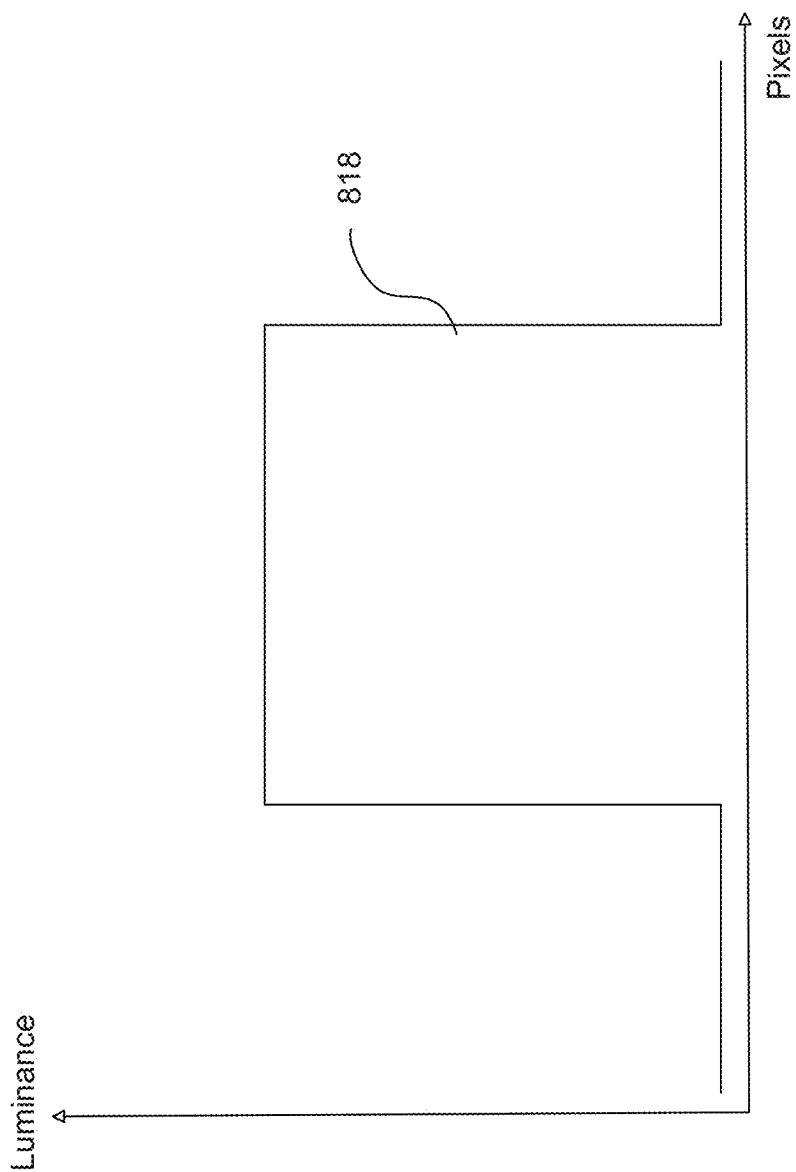
FIG. 8 is a graph of an exemplary pillbox model of a blur image, in accordance with one embodiment of the present invention.

Referring now to FIG. 8, a graph of an exemplary pillbox model of a blur image 518 shown, in accordance with one embodiment of the present invention. The FIG. 8 embodiment is presented for purposes of illustration, and in alternate embodiments, the present invention may utilize pillbox models with elements and configurations other than those discussed in conjunction with the FIG. 8 embodiment.

In the FIG. 8 embodiment, luminance is represented on a vertical axis and pixels are represented on a horizontal axis. In the FIG. 8 graph, pillbox model 818 displays a typical sharp-edged shape. Depending upon image characteristics of a photographic target or scene, certain non-Gaussian models, such as pillbox model 818, may be more effective. For example, a pillbox model 818 may be better for a dark night scene that includes a very bright light source such as a candle.

Figure 9:
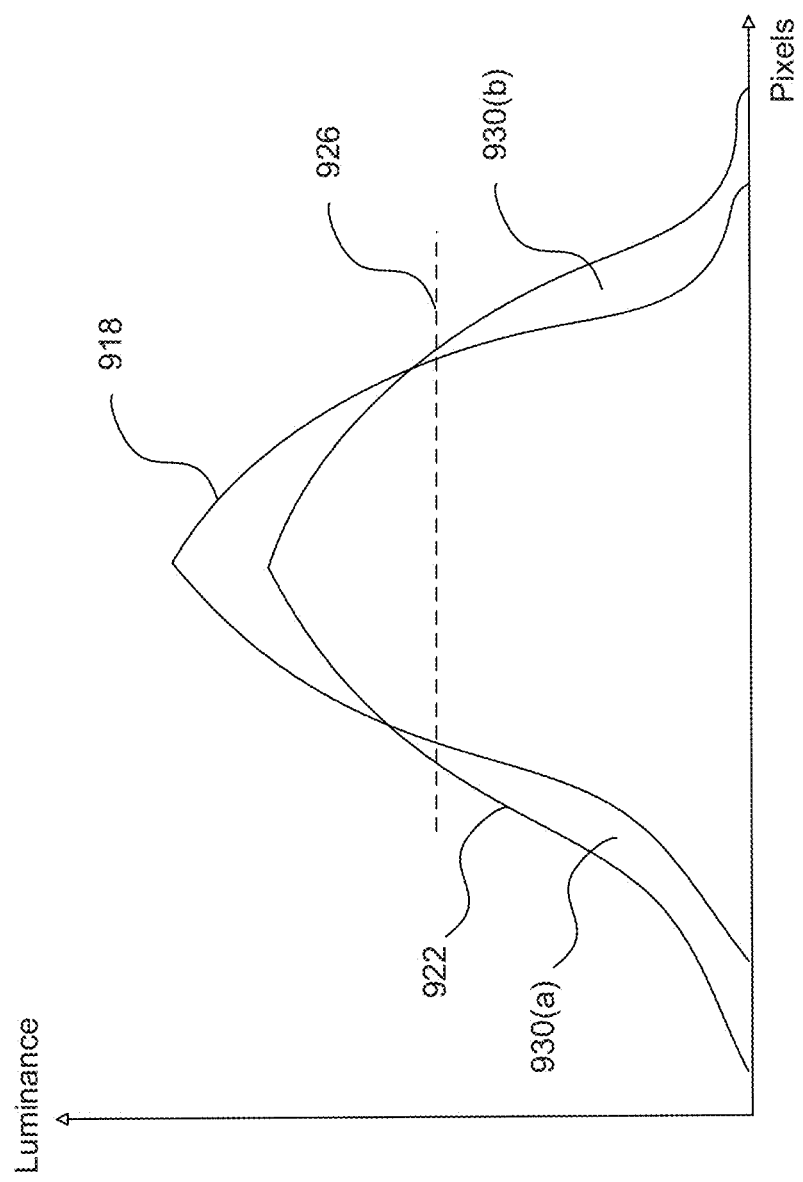
FIG. 9 is a graph of two saturated Gaussian blur images, in accordance with one embodiment of the present invention.

Referring now to FIG. 9, a diagram of two saturated Gaussian images 918 and 922 is shown, in accordance with one embodiment of the present invention. The FIG. 9 embodiment is presented for purposes of illustration, and in alternate embodiments, the present invention may utilize Gaussian images with elements and configurations other than those discussed in conjunction with the FIG. 9 embodiment.

In the FIG. 9 embodiment, waveforms for a first Gaussian blur image 918 and a second Gaussian blur image 922 are shown superimposed. Since image 918 is more focused, its waveform shape is narrower and taller than the waveform of image 922. In the FIG. 9 embodiment, the Gaussian images are clipped/saturated because they both exceed a saturation threshold level 926.

In the FIG. 9 embodiment, the graph also includes an edge region 930 that is comprised of a first edge region 930(a) and a second edge region 930(b). First edge region 930(a) is the area on the left side of the FIG. 9 graph that is less than the saturation threshold 926 and between the left sides of waveform 922 and waveform 918. Second edge region 930(b) is the area on the right side of the FIG. 9 graph that is less than the saturation threshold 926 and between right sides of waveform 922 and waveform 918. Certain techniques for detecting Gaussian scenes containing Gaussian blur images are further discussed below in conjunction with FIGS. 10-14.

Figure 10:
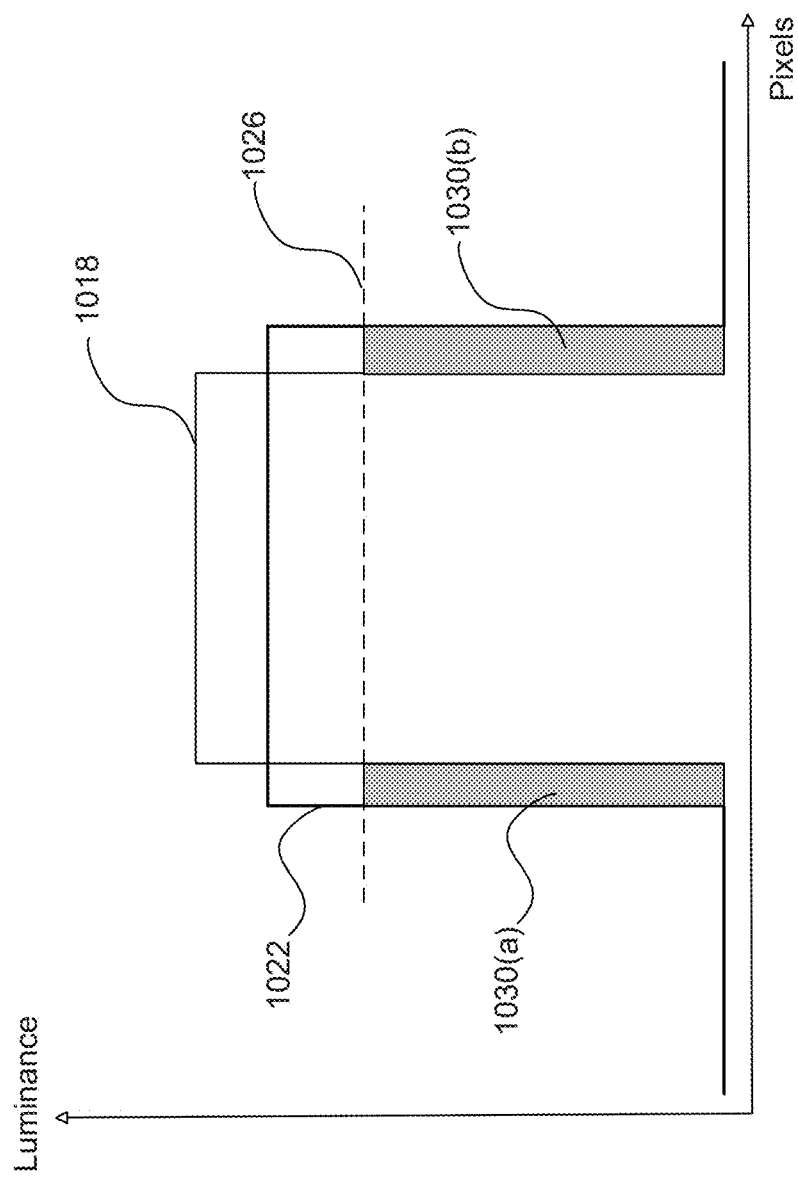
FIG. 10 is a graph of two saturated pillbox blur images, in accordance with one embodiment of the present invention.

Referring now to FIG. 10, a diagram of two saturated pillbox images 1018 and 1022 is shown, in accordance with one embodiment of the present invention. The FIG. 10 embodiment is presented for purposes of illustration, and in alternate embodiments, the present invention may utilize pillbox images with elements and configurations other than those discussed in conjunction with the FIG. 10 embodiment.

In the FIG. 10 embodiment, waveforms for a first pillbox blur image 1018 and a second pillbox blur image 1022 are shown superimposed. Since image 1018 is more focused, its waveform shape is narrower and taller than the waveform of image 1022. In the FIG. 10 embodiment, the pillbox images are clipped/saturated because they both exceed a saturation threshold level 1026.

In the FIG. 10 embodiment, the graph also includes an edge region 1030 that is comprised of a first edge region 1030(a) and a second edge region 1030(b). First edge region 1030(a) is the shaded area on the left side of the FIG. 10 graph that is less than the saturation threshold 1026 and between the left sides of waveform 1022 and waveform 1018. Second edge region 1030(b) is the shaded area on the right side of the FIG. 10 graph that is less than the saturation threshold 1026 and is between right sides of waveform 1022 and waveform 1018. FIG. 10 is a one dimensional illustration of a pillbox blur. For two dimensional images, the edge region is a ring-shaped area between the boundaries of the two pillboxes.

In accordance with the present invention, depth estimator 416 (FIG. 4) may need to determine whether a particular scene is a Gaussian scene or a pillbox scene for purposes of selecting an appropriate depth estimation procedure. For example, in conjunction with FIG. 6 above, a basic depth estimation procedure is discussed, as disclosed in U.S. Pat. No. 8,045,046 to Li et al.

In addition, a Gaussianization depth estimation procedure as well as a fillbox procedure are disclosed in U.S. patent application Ser. No. 13/426,828 by Li et al. entitled "System And Method For Performing Depth Estimation Utilizing Pillbox Defocused Images," filed on Mar. 22, 2012, which is hereby incorporated by reference. The Gaussianization depth estimation procedure can handle Gaussian blurs and non-Gaussian blurs when the captured images are not clipped.

When the captured images are clipped (overexposed or underexposed), depth estimator 416 must determine whether treat them as Gaussian blurs or pillbox blurs. In the case of clipped pillbox blurs, depth estimator 416 may utilize the fillbox procedure and Gaussianization procedure referred to above. In the case of Gaussian blurs, depth estimator 416 may utilize a clipped-pixel substitution procedure that is disclosed in U.S. patent application Ser. No. 13/416,049 by Li et al. entitled "System And Method For Performing Depth Estimation With Defocused Images Under Extreme Lighting Conditions," filed on Mar. 9, 2012, which is hereby incorporated by reference.

With regard to the embodiments of FIGS. 9-10, a saturated pillbox image (FIG. 10) generally has sharper edges when compared to a saturated Gaussian blur (FIG. 9). Because of the geometry of the edge region, the average luminance difference in the edge region 1030 can be shown to be greater for pillbox blurs as compared to Gaussian blurs (see FIG. 9). In accordance with the present invention, depth estimator 416 may utilize this property to detect either a Gaussian scene or a pillbox scene. The foregoing fillbox procedure and Gaussianization procedure may be utilized when a pillbox scene is detected. Conversely, the clipped-pixel substitution procedure may be utilized when a Gaussian scene is detected.

In certain situations, Gaussian blurs may be mistakenly categorized as pillbox blurs. Therefore, a scene detector 424 (FIG. 4) may use several techniques to re-evaluate and potentially reclassify these erroneous pillbox candidates as Gaussian blurs, in accordance with the present invention. Additional details for performing one embodiment of an enhanced scene detection procedure are further discussed below in conjunction with FIGS. 11-14.

Figure 11A:
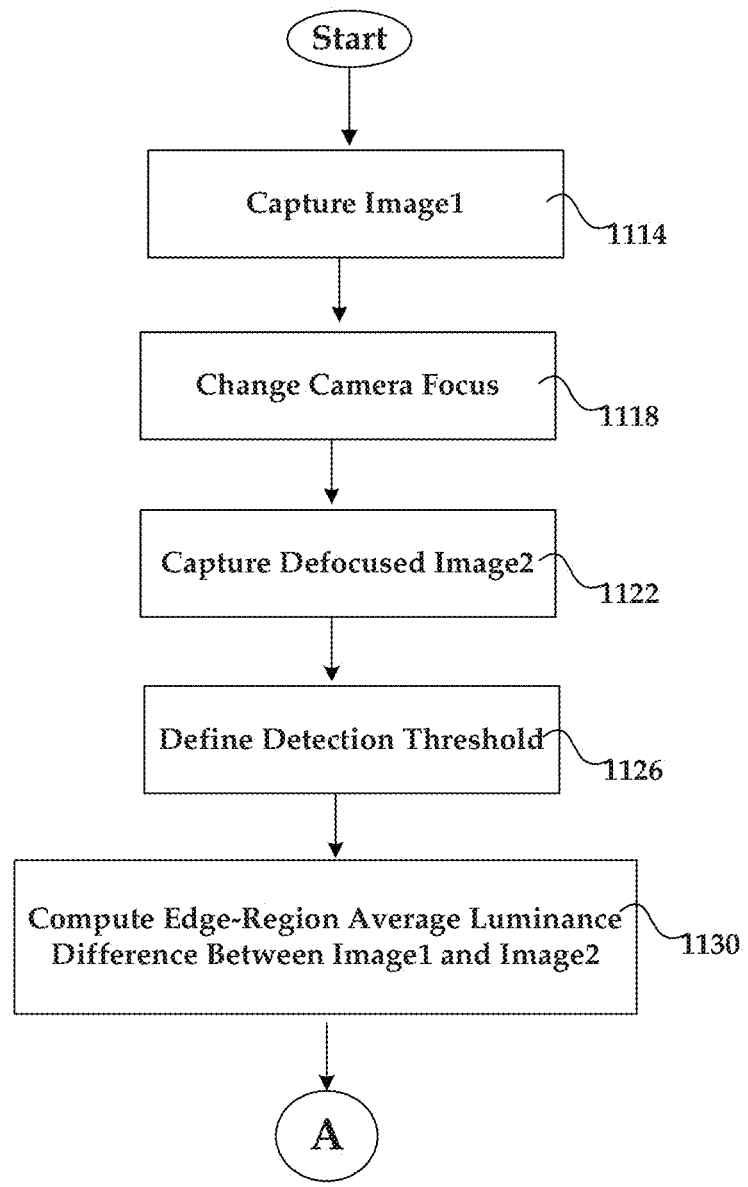
FIGS. 11A-11C are a flowchart of method steps for performing an enhanced depth estimation procedure, in accordance with one embodiment of the present invention.
Figure 11B:
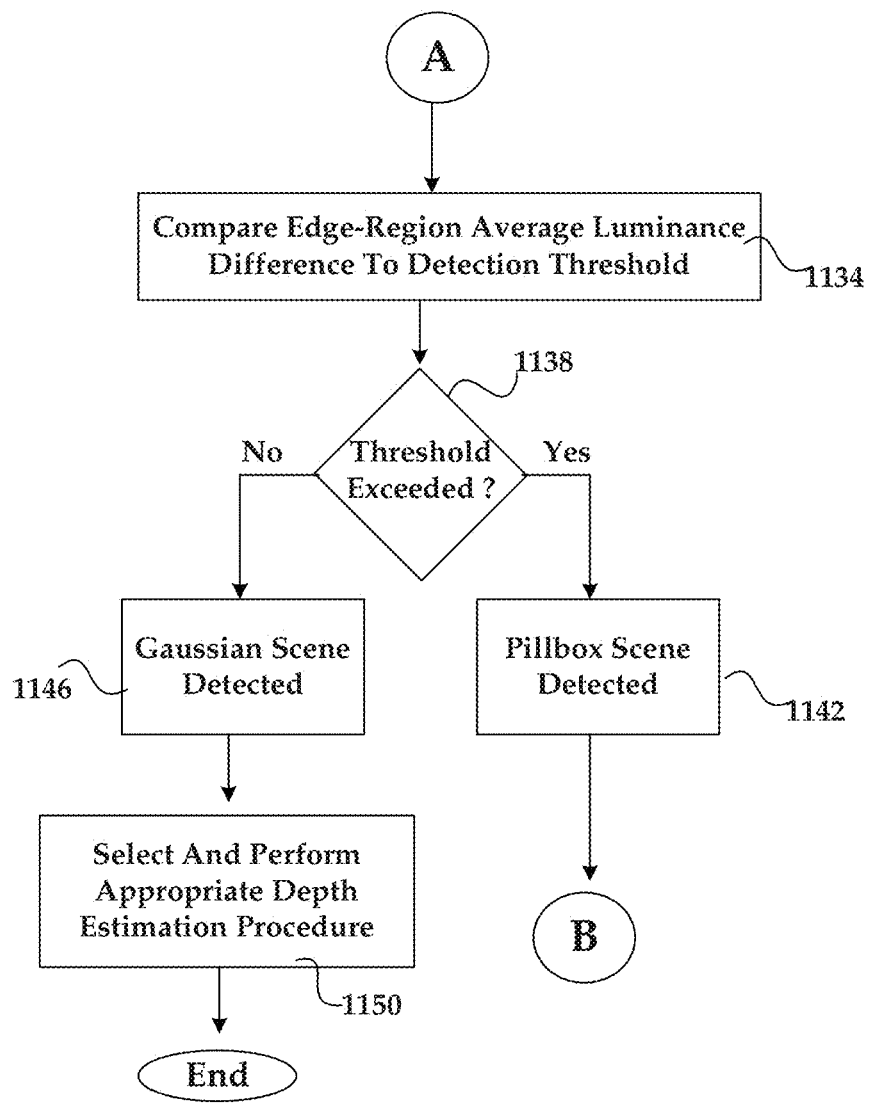
Figure 11C:
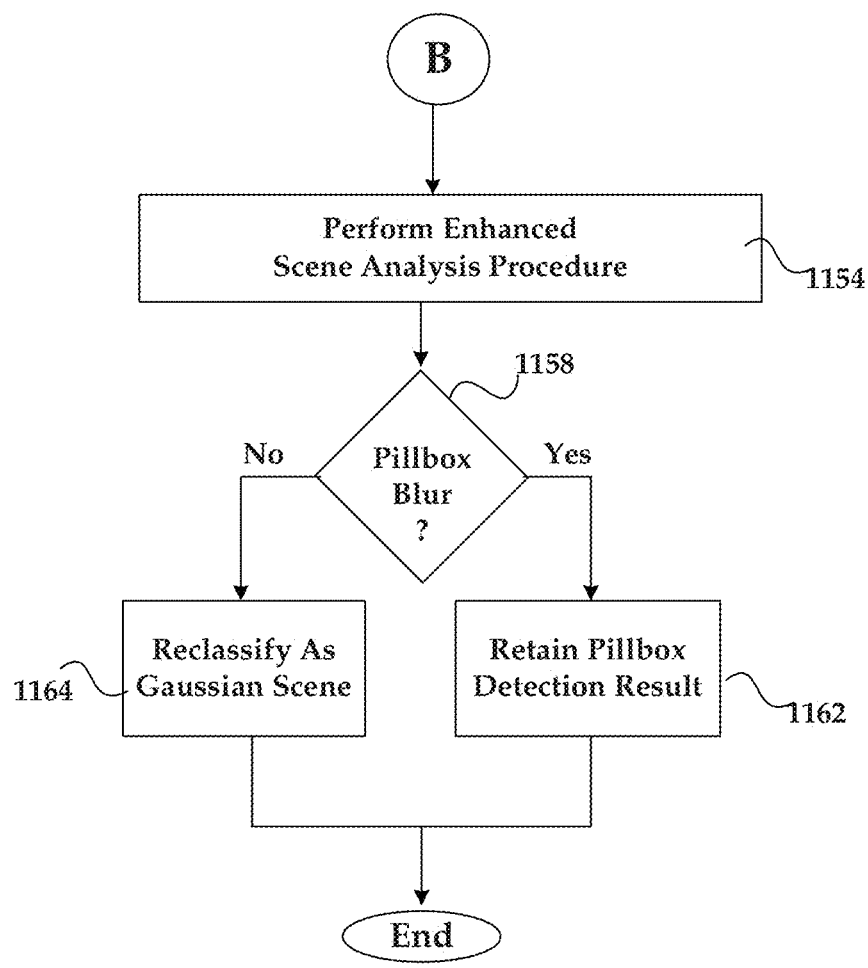

Referring now to FIGS. 11A-11C, a flowchart of method steps for performing an enhanced depth estimation procedure is shown, in accordance with one embodiment of the present invention. The FIG. 11 embodiment is presented for purposes of illustration, and in alternate embodiments, the present invention may utilize various steps and sequences other than those steps and sequences discussed in conjunction with the FIG. 11 embodiment.

In the FIG. 11A embodiment, in step 1114, camera 110 initially captures an image1. In step 1118, the focus setting of camera 110 is changed. For example, in the FIG. 11A embodiment, the focus setting may be adjusted to decrease the focus of camera 110 by one or more depths-of-field (DOF). In step 1122, camera 110 captures a defocused image2 that is more blurry (out of focus) than previously captured image1.

In step 1126, a scene detector 424 or other appropriate entity defines a detection threshold for choosing between a Gaussian scene and a pillbox scene. In step 1130, scene detector 424 computes an edge-region average luminance difference between image1 and image2, as discussed above in conjunction with FIG. 10. The FIG. 11A process then advances to step 1134 of FIG. 11B through connecting letter "A."

In steps 1134 and 1138, scene detector 424 compares the calculated edge-region average luminance difference to the defined detection threshold. If the detection threshold is not exceeded, then in step 1146, scene detector 424 identifies the captured image1 and image2 as part of a Gaussian scene, and in step 1150, a depth estimator 416 (FIG. 4) may select and perform an appropriate depth estimation procedure that is suitable for a Gaussian scene.

However, if the detection threshold is exceeded in steps 1134 and 1138, then in step 1142, scene detector 424 identifies the captured image1 and image2 as pillbox blur candidates. The FIG. 11B process may then advance to step 1154 of FIG. 11C through connecting letter "B." In steps 1154 and 1158 of FIG. 11C, scene detector 424 performs an enhanced scene analysis procedure upon the pillbox blur candidates generated in foregoing step 1142 to thereby verify that these detection results are accurate.

If scene detector 424 determines that the pillbox blur candidates where correctly classified, then in step 1162, scene detector 424 retains the pillbox detection results from step 1142 of FIG. 11B. However, if scene detector 424 determines that the pillbox blur candidates where incorrectly classified in step 1142 of FIG. 11B, then in step 1164, scene detector 424 reclassifies the pillbox blur candidates as Gaussian blur images. The depth estimator 416 may then select and perform an appropriate depth estimation procedure. Additional details for performing the enhanced scene analysis procedure of foregoing step 1154 are further discussed below in conjunction with FIGS. 12A-14B Referring now to FIG. 12A, two diagrams illustrating good registration characteristics for two pillbox blur images are shown, in accordance with one embodiment of the present invention. The FIG. 12A embodiment is presented for purposes of illustration, and in alternate embodiments, the present invention may utilize good registration characteristics other than those discussed in conjunction with the FIG. 12A embodiment.

Figure 12A:
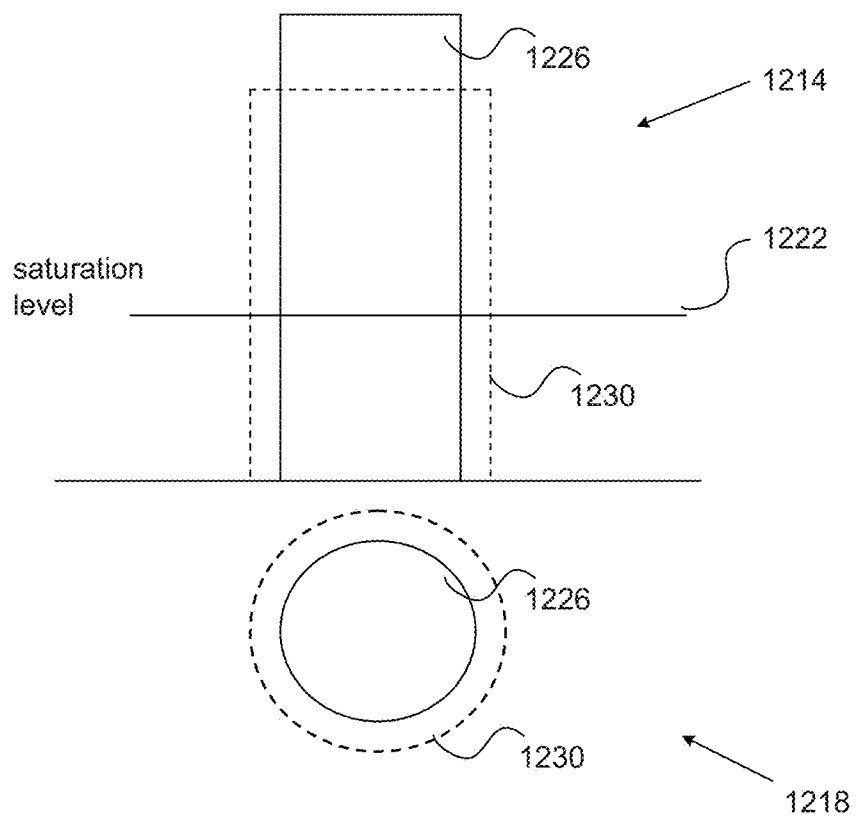
FIG. 12A is two diagrams illustrating good registration characteristics for two pillbox blur images, in accordance with one embodiment of the present invention.

In the FIG. 12A embodiment, a side profile 1214 is shown for two pillbox images 1226 and 1230 that are similar to pillbox images 1018 and 1022 as shown and discussed above in conjunction with FIG. 10. The side profile 1214 further includes a saturation level 1222. The FIG. 12A embodiment also includes a top profile 1218 of pillbox images 1226 and 1230. Top profile 1218 illustrates good registration characteristics with pillbox image 1226 being centered inside of pillbox image 1230 at saturation level 1222.

In accordance with the present invention, good registration may be defined by utilizing any appropriate criteria. For example, in one embodiment of the present invention, top profile 1218 may exhibit good registration characteristics if each saturated pixel from one blur image is also saturated in the other blur image at the same pixel coordinate location. The present invention may therefore perform a registration analysis procedure during the enhanced scene detection procedure discussed above to thereby re-evaluate and potentially reclassify candidate pillbox blur images. Additional details regarding the registration analysis procedure are further discussed below in conjunction with FIGS. 12B-14B.

Figure 12B:
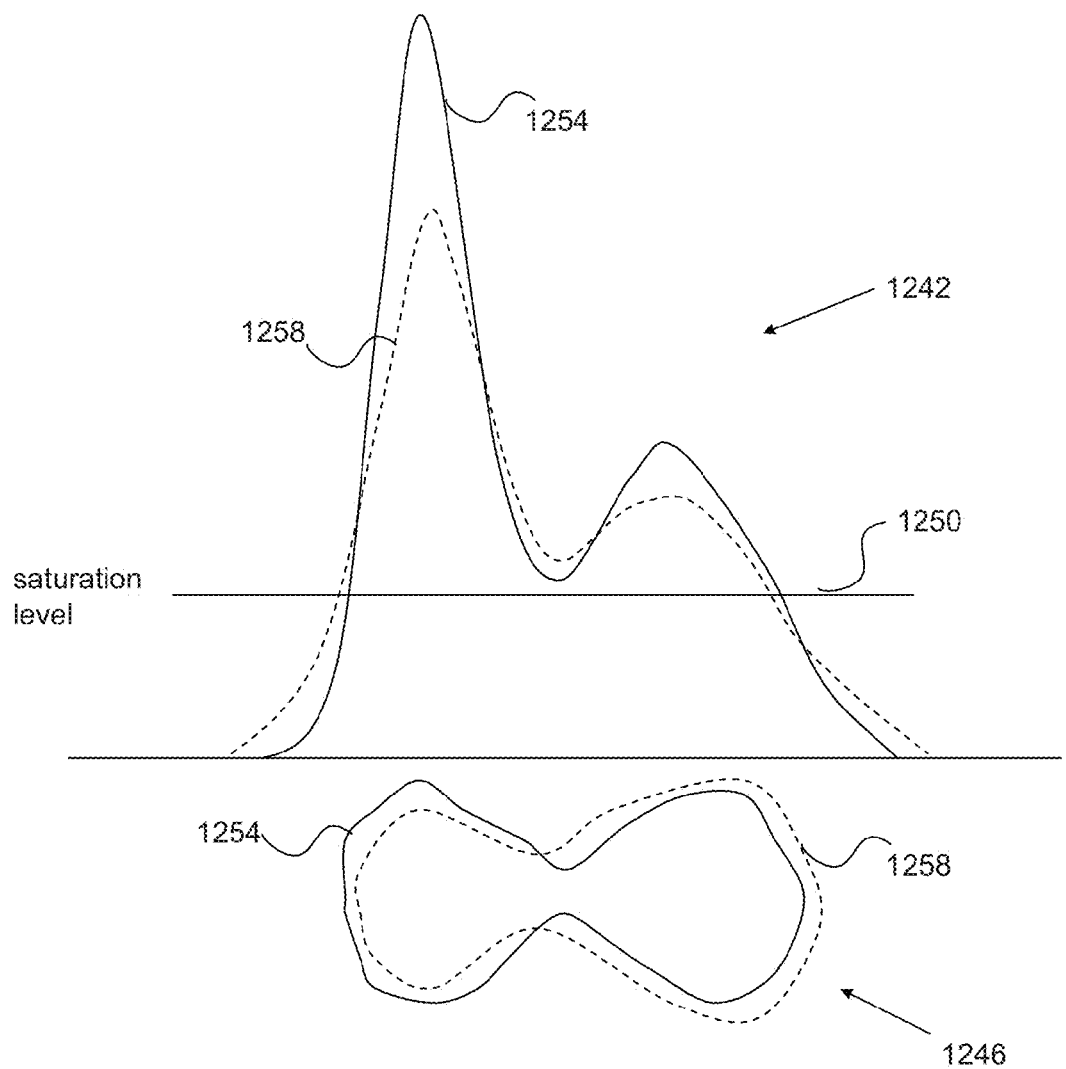
FIG. 12B is two diagrams illustrating bad registration characteristics for two Gaussian blur images, in accordance with one embodiment of the present invention.

Referring now to FIG. 12B, two diagrams illustrating bad registration characteristics for two Gaussian blur images are shown, in accordance with one embodiment of the present invention. The FIG. 12B embodiment is presented for purposes of illustration, and in alternate embodiments, the present invention may utilize bad registration characteristics other than those discussed in conjunction with the FIG. 12B embodiment.

In the FIG. 12B embodiment, a side profile 1242 is shown for two Gaussian images 1254 and 1258 that are analogous to Gaussian images 918 and 922 as shown and discussed above in conjunction with FIG. 9. The side profile 1242 further includes a saturation level 1250. The FIG. 12B embodiment also includes a top profile 1246 of Gaussian images 1254 and 1258. Top profile 1246 illustrates bad registration characteristics with neither image 1254 nor image 1258 being centered inside of the other image at saturation level 1250.

In accordance with the present invention, bad registration may be defined by utilizing any appropriate criteria. For example, in one embodiment of the present invention, top profile 1246 may exhibit bad registration characteristics if each saturated pixel from one blur image is not also saturated in the other blur image at the same pixel coordinate location. The present invention may therefore perform a registration analysis procedure during the enhanced scene detection procedure discussed above to thereby re-evaluate and potentially reclassify candidate pillbox blur images as Gaussian blur images. Additional details regarding the registration analysis procedure are further discussed below in conjunction with FIG. 14B.

Figure 13:
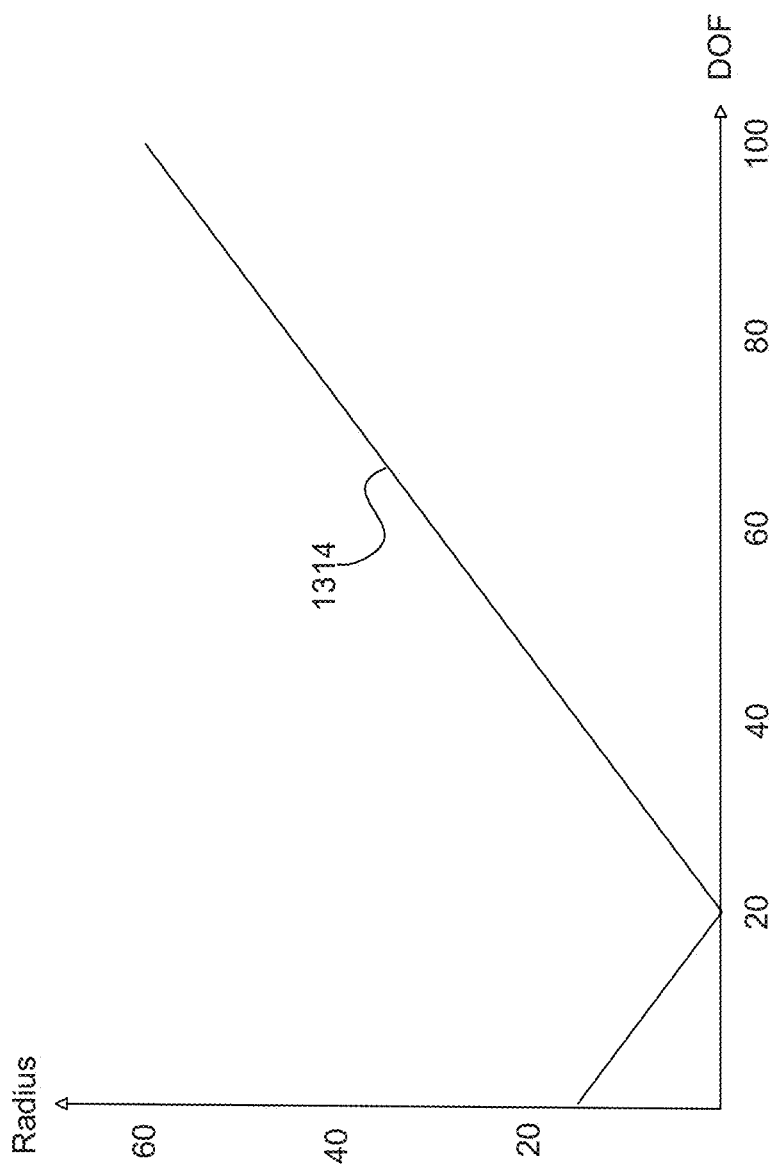
FIG. 13 is a graph of an exemplary calibrated radius change curve, in accordance with one embodiment of the present invention.

Referring now to FIG. 13, a graph of an exemplary calibrated radius change curve 1314 is shown, in accordance with one embodiment of the present invention. The FIG. 13 embodiment is presented for purposes of illustration, and in alternate embodiments, the present invention may be implemented to utilize radius rate curves with configurations and parameters in addition to, or instead of, certain of those configurations and parameters discussed in conjunction with the FIG. 13 embodiment.

The FIG. 13 graph presents the blur radius size of a lens point spread function (PSF) on a vertical axis, and presents the depth-of-focus (DOF) distance from an in-focus position on a horizontal axis. In the FIG. 13 embodiment, curve 1214 is an example of the linear dependence of blur radius size on DOF distance. This linear dependence is a characteristic of pillbox blur images, and is also atypical of Gaussian blur images. By utilizing this prior knowledge, classification of the blur type of a target scene by analyzing how the blur radius changes based on a different blur level may be effectively utilized.

For example, assume that there is a lens system with round shaped PSF. In this case, from the definition of depth-of-field (DOF), the radius of the PSF changes linearly with respect to the DOF distance. Note that the lens characteristics, such as size of PSF and supported DOF range, depend on the particular system. The present invention utilizes this kind of prior knowledge to determine whether the target scene is likely to be a pillbox blur or not.

In certain embodiments, the radius of a pillbox blur image may be determined by counting the saturated pixels. For example, consider the following scenes. The radius of the pillbox blur (impulse response of lens PSF) may be defined as the square root of the number of the saturation pixels in the target area. By utilizing the FIG. 13 radius change curve 1314 to evaluate the DOF distance between the two scenes in light of the prior knowledge of the lens PSF (which may be expressed as Change in Radius/Change in DOF distance), the present invention may determine whether the target blur is likely to be a pillbox blur or not.

In other words, if the target blur is a pillbox, there should be an expected characteristic rate with which the blur size changes for given a DOF distance. However, for a Gaussian blur, the characteristics would be random or scene dependent and almost irrelevant to the lens PSF. Furthermore, assuming the two images at different blur levels are captured for the same scene, if the blur type is a pillbox blur, then the two pillbox blurs at different blur levels should be registered nicely with the center of the pillbox located in approximately the same position. This information on how well the two saturated areas are aligned may also be utilized to contribute to the blur type clarification. This proposed scene clarification thus reduces incorrect classification results caused by the image processing algorithm designed for Gaussian blur to pillbox blur or vice versa.

The present invention therefore provides an enhanced technique for identifying blur types of a target scene by analyzing how the blur images change based on a different blur level. In the analysis of these blur image changes, the present invention utilizes saturated pixel counts to approximate the radius size of pillbox blurs. The invention may then utilize the saturated pixel count to determine whether the target blur is pillbox or not. Furthermore, the invention may check the idealness of pillbox blurs based on the registration of two pillbox blurs at different blur levels. Additional details for performing enhanced scene detection procedures are further discussed below in conjunction with FIGS. 14A and 14B.

Figure 14A:
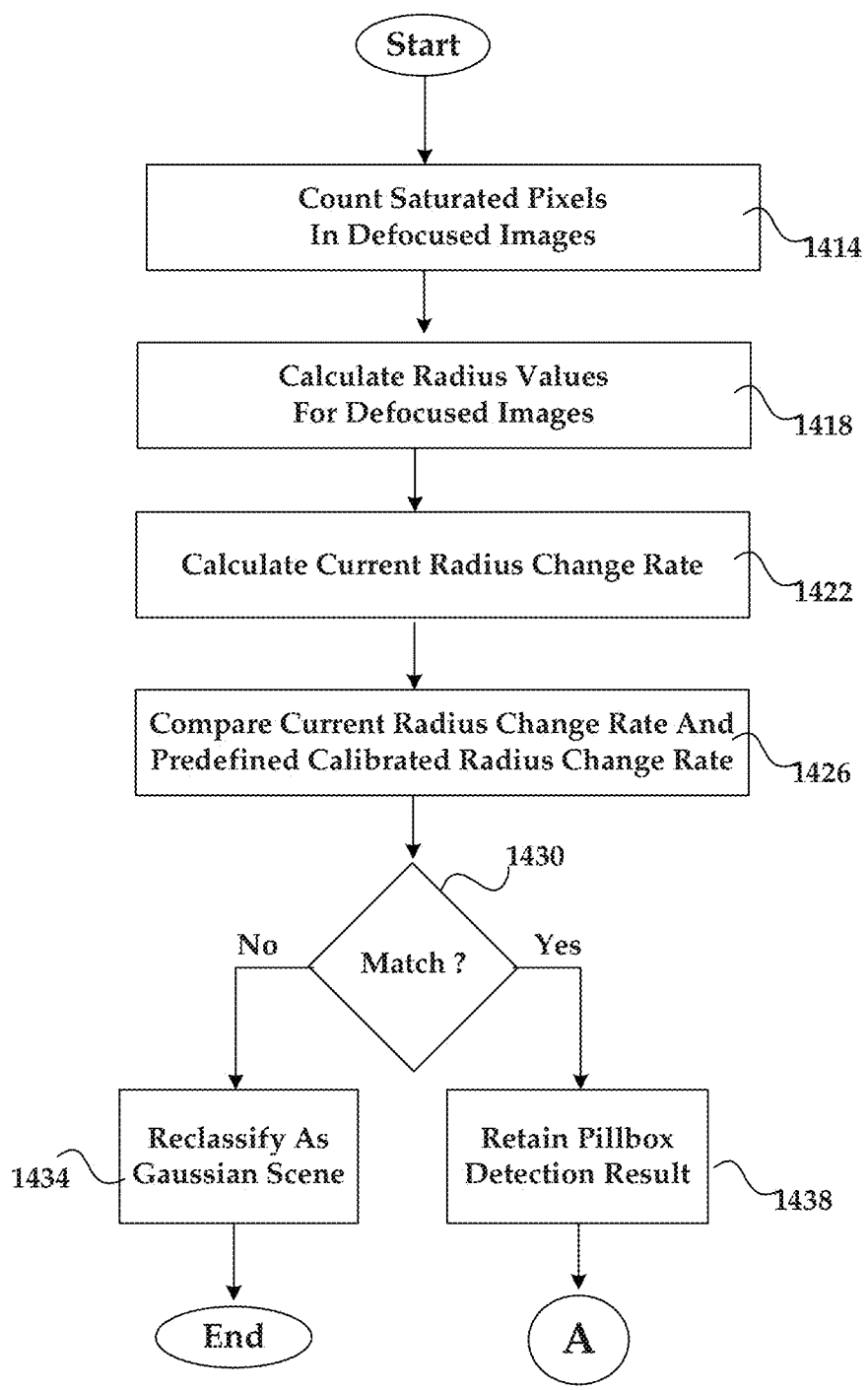
FIGS. 14A-14B a flowchart of method steps for performing an enhanced scene detection procedure, in accordance with one embodiment of the present invention.
Figure 14B:
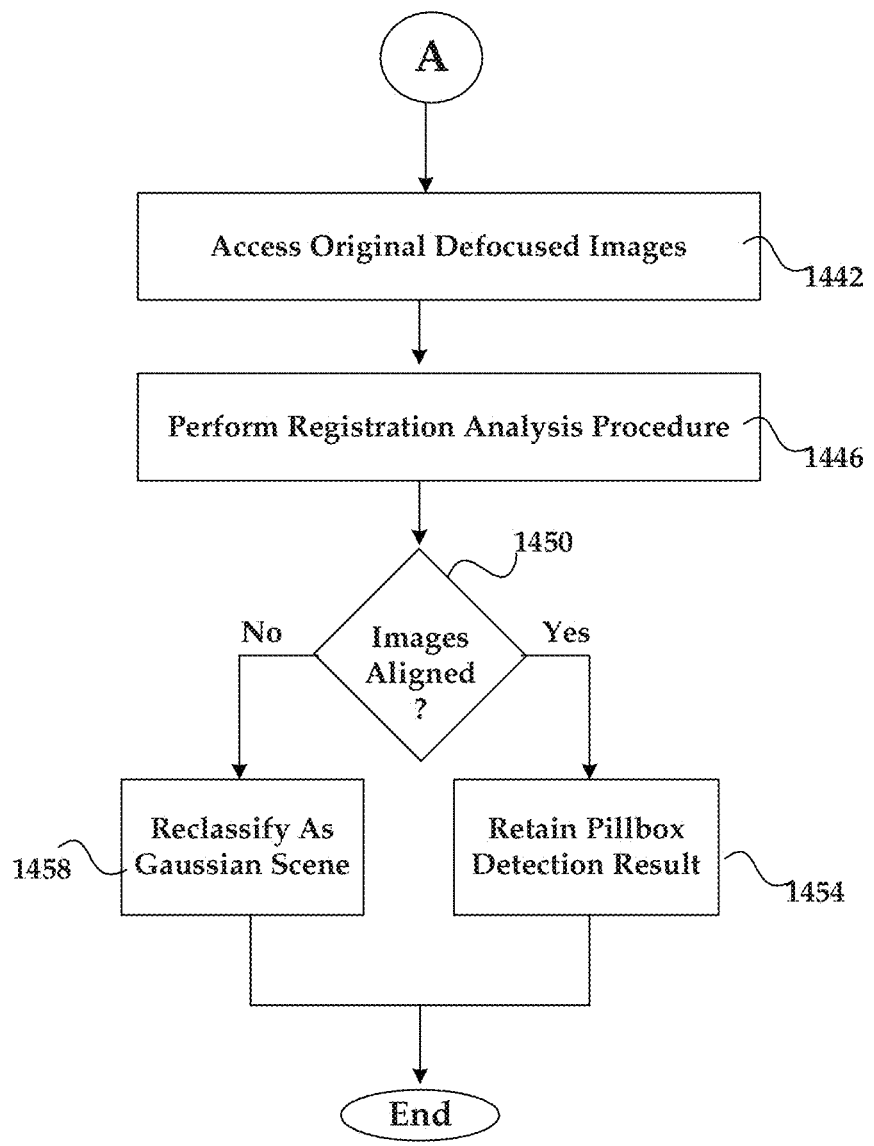

Referring now to FIGS. 14A-14B, a flowchart of method steps for performing an enhanced scene detection procedure is shown, in accordance with one embodiment of the present invention. In accordance with one embodiment of the present invention, FIG. 14A depicts a radius analysis procedure, and FIG. 14B depicts a registration analysis procedure. In certain embodiments, the embodiments of FIGS. 14A and 14B may correspond to the enhanced scene analysis procedure referred to above in step 1154 of FIG. 11C.

The FIG. 14 embodiment is presented for purposes of illustration, and in alternate embodiments, the present invention may readily utilize various steps and sequences other than those steps and sequences discussed in conjunction with the FIG. 14 embodiment. For example, either the FIG. 14A procedure or the FIG. 14B may be performed separately to re-evaluate pillbox blur candidates. In addition, in certain embodiments, the FIG. 14B procedure may be performed prior to the FIG. 14A procedure.

In step 1414 of the FIG. 14A embodiment, a scene detector 424 (FIG. 4) or other appropriate entity initially counts the number of saturated pixels in each of the two pillbox blur candidates from step 1142 of the foregoing FIG. 11C. In step 1418, the scene detector 424 utilizes the two saturated pixels totals to calculate radius values for the two respective pillbox blur candidates, as discussed above in conjunction with FIG. 13.

In step 1422, the scene detector 424 utilizes the two radius values to calculate a current radius change rate for the pillbox blur candidates. In step 1426, the scene detector 424 compares the current radius change rate to a predefined calibrated radius change rate. In certain embodiments, the predefined calibrated radius change rate may be derived from a calibrated radius change curve 1314, as discussed above in conjunction with FIG. 13.

In step 1430, the scene detector 424 determines whether the current radius change rate matches the predefined calibrated radius change rate. If not, then in step 1434, the scene detector 424 reclassifies the pillbox blur candidates as Gaussian blurs. However, if the current radius change rate matches the predefined calibrated radius change rate, then the scene detector 424 retains the original detection result for the two pillbox blur candidates. The FIG. 14A process may then advance to step 1442 of FIG. 14B through connecting letter "A."

In step 1442 of the FIG. 14B embodiment, the scene detector 424 or other appropriate entity initially accesses the two pillbox blur candidates from step 1438 of the foregoing FIG. 14A. In step 1446, the scene detector 424 performs a registration analysis procedure upon the pillbox blur candidates to again verify that these detection results are accurate. The registration analysis procedure may be performed by utilizing any effective techniques. For example, in certain embodiments, the scene detector 424 may evaluate registration characteristics for the pillbox blur candidates by determining whether each saturated pixel from one blur image is also saturated in the other blur image at the same pixel coordinate location, as discussed above in conjunction with FIGS. 12A and 12B.

In step 1450, the scene detector 424 determines whether the two blur images are aligned. If the scene detector 424 determines that the pillbox blur candidates were correctly classified, then in step 1454, the scene detector 424 retains the pillbox detection results from step 1438 of FIG. 14A. However, if the scene detector 424 determines that the pillbox blur candidates where incorrectly classified, then in step 1458, the scene detector 424 reclassifies the pillbox blur candidates as Gaussian blur images. A depth estimator 416 (FIG. 4) may then select and perform an appropriate depth estimation procedure. The present invention therefore provides an improved system and method for utilizing enhanced scene detection for performing a depth estimation procedure.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing an enhanced scene detection procedure, comprising:
   a sensor device for capturing blur images of a photographic target, said blur images each corresponding to a scene type that is detected from a first scene type and a second scene type; and
   a scene detector that performs an initial scene detection procedure to identify a candidate scene type for said blur images, said scene detector then performing said enhanced scene detection procedure to identify a final scene type for said blur images, said candidate scene type initially being a pillbox candidate type.

2. A system for performing an enhanced scene detection procedure, comprising:
   a sensor device for capturing blur images of a photographic target, said blur images each corresponding to a scene type that is detected from a first scene type and a second scene type; and
   a scene detector that performs an initial scene detection procedure to identify a candidate scene type for said blur images, said scene detector then performing said enhanced scene detection procedure to identify a final scene type for said blur images, said first scene type being a Gaussian scene type and said second scene type being a pillbox scene type.

3. The system of claim 2 wherein said sensor device and said scene generator are implemented in an electronic camera device.

4. The system of claim 3 wherein said electronic camera device includes a depth estimator that utilizes scene detection results from said enhanced scene detection procedure for selecting an appropriate depth estimation algorithm.

5. The system of claim 4 wherein said electronic camera device utilizes one or more depth values generated by said depth estimation algorithm to perform an automatic focusing procedure.

6. The system of claim 1 wherein said blur images are clipped because of exceeding a saturation threshold level of said sensor device.

7. The system of claim 6 wherein said sensor device captures a first image 1 corresponding to said photographic target by utilizing a first lens position, said camera device then being adjusted to a second lens position that is different than said first lens position, said sensor device capturing an image2 corresponding to said photographic target by utilizing said second lens position, said image1 and said image 2 constituting said blur images.

8. The system of claim 2 wherein said candidate scene type is initially a pillbox candidate type.

9. The system of claim 8 wherein said scene detector performs a radius analysis procedure upon said blur images from said pillbox candidate type.

10. The system of claim 9 wherein said scene detector counts saturated pixel totals in each of said blur images.

11. The system of claim 10 wherein said scene detector utilizes said saturated pixel totals to calculate radius values for each of said blur images.

12. The system of claim 11 wherein said radius values are equal to a square root of said saturated pixel totals for each of said blur images.

13. The system of claim 12 wherein said scene detector utilizes said radius values to calculate a current radius change rate for said blur images.

14. The system of claim 13 wherein said current radius change rate is equal to a change in said radius values over a change in depth of focus distance for said blur images.

15. The system of claim 13 wherein said scene detector compares said current radius change rate and a predefined calibrated radius change rate to determine whether a matching result exists, said scene detector retaining said pillbox candidate type for said blur images if said matching result exists, said scene detector reclassifying said pillbox candidate type as a Gaussian blur type if said matching result do not exist.

16. The system of claim 15 wherein said scene detector obtains said predefined calibrated radius change rate from a calibrated radius change curve that depicts a linear dependence of blur radius sizes and depth-of-focus distance values.

17. The system of claim 8 wherein said scene detector performs a registration analysis procedure upon said blur images from said pillbox candidate type, said registration analysis procedure being alternately performed both independently and in conjunction with a radius analysis procedure.

18. The system of claim 17 wherein said scene detector retains said pillbox candidate type for said blur images if good registration characteristics exist, said scene detector reclassifying said pillbox candidate type as a Gaussian blur type if bad registration characteristics exist.

19. The system of claim 18 wherein said scene detector determines that said good registration characteristics exist if each saturated pixel from one of said blur images is also saturated in the other of said blur images at the same pixel coordinate location, said scene detector determining that said bad registration characteristics exist if each saturated pixel from said one of said blur images is also saturated in said other of said blur images at said same pixel coordinate location.

20. A method for performing an enhanced scene detection procedure by performing the steps of:
  utilizing a sensor device for capturing blur images of a photographic target, said blur images each corresponding to a scene type that is detected from a first scene type and a second scene type; and
  providing a scene detector that performs an initial scene detection procedure to identify a candidate scene type for said blur images, said scene detector then performing said enhanced scene detection procedure to identify a final scene type for said blur images, said candidate scene type initially being a pillbox candidate type.

* * * * *